United States Patent

Sens et al.

Patent Number: 5,719,288
Date of Patent: Feb. 17, 1998

[54] PYRIDONE DYES

[75] Inventors: Ruediger Sens, Mannheim; Karl-Heinz Etzbach, Frankenthal; Volker Bach, Neustadt, all of Germany

[73] Assignee: BASF Aktiengesellschaft, Ludwigshafen, Germany

[21] Appl. No.: 652,465

[22] PCT Filed: Dec. 10, 1994

[86] PCT No.: PCT/EP94/04114

§ 371 Date: Jun. 14, 1996

§ 102(e) Date: Jun. 14, 1996

[87] PCT Pub. No.: WO95/17470

PCT Pub. Date: Jun. 29, 1995

[30] Foreign Application Priority Data

Dec. 23, 1993 [DE] Germany ............ 43 44 116.5

[51] Int. Cl.$^6$ ............ C07D 417/06; C07D 409/06; C09B 67/00

[52] U.S. Cl. ............ 546/270.7; 8/568; 546/270.7; 546/281.4; 544/55; 544/60; 544/131; 544/333

[58] Field of Search ............ 546/270.7, 281.4

[56] References Cited

U.S. PATENT DOCUMENTS 5,369,078 11/1994 Eguchi et al. ............ 503/227

FOREIGN PATENT DOCUMENTS 550817 7/1993 European Pat. Off. .

Primary Examiner—Jane Fan
Attorney, Agent, or Firm—Oblon, Spivak, McClelland, Maier & Neustadt, P.C.

[57] ABSTRACT

Pyridone dyes of the formula

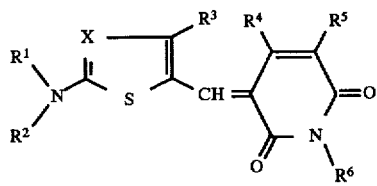

where

X is nitrogen or C—CN, $R^1$ and $R^2$ are each substituted or unsubstituted $C_1$–$C_{10}$-alkyl, $C_5$–$C_7$-cycloalkyl, $C_3$–$C_4$-alkenyl or substituted or unsubstituted phenyl, or $R^1$ and $R^2$ together with the nitrogen atom joining them together are a heterocyclic radical, $R^3$ is hydrogen, $C_1$–$C_{10}$-alkyl, $C_4$–$C_7$-cylcoalkyl, benzyl, substituted or unsubstituted phenyl, substituted or unsubstituted furanyl or substituted or unsubstituted thienyl, $R^4$ is hydrogen, $C_1$–$C_4$-alkyl or substituted or unsubstituted phenyl, $R^5$ is cyano, carbamoyl, mono- or di($C_1$–$C_8$-alkyl)carbamoyl, carboxyl, $C_1$–$C_8$-alkoxycarbonyl or benzimidazolyl, and $R^6$ is substituted or unsubstituted $C_1$–$C_{10}$-alkyl, $C_5$–$C_7$-cycloalkyl or substituted or unsubstituted phenyl, are useful for dyeing or printing textile materials.

10 Claims, No Drawings

PYRIDONE DYES

The present invention relates to novel pyridone dyes of the formula I

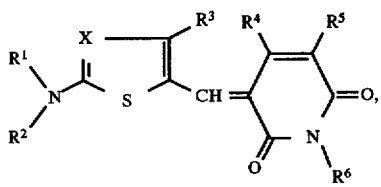

where

X is nitrogen or C—CN, $R^1$ and $R^2$ are identical or different and each is independently of the other unsubstituted or $C_1$–$C_4$-alkoxycarbonyl-, $C_1$–$C_4$-alkoxycarbonyloxy- or phenyl-substituted $C_1$–$C_{10}$-alkyl with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy- or halogen-substituted phenyl, or $R^1$ and $R^2$ are together with the nitrogen atom joining them together a 5- or 6-membered saturated heterocyclic radical with or without further hetero atoms, $R^3$ is hydrogen, $C_1$–$C_{10}$-alkyl, $C_5$–$C_7$-cycloalkyl, benzyl, unsubstituted or $C_1$–$C_4$-alkyl-, $C_1$–$C_4$-alkoxy- or halogen-substituted phenyl, furanyl or thienyl, the last two radicals being unsubstituted or $C_1$–$C_4$-alkyl- or halogen-substituted, $R^4$ is hydrogen, $C_1$–$C_4$-alkyl or unsubstituted or $C_1$–$C_4$-alkyl-, $C_1$–$C_4$-alkoxy- or halogen-substituted phenyl, $R^5$ is cyano, carbamoyl, mono- or di($C_1$–$C_8$-alkyl)carbamoyl, carboxyl, $C_1$–$C_8$-alkoxycarbonyl or benzimidazolyl, and $R^6$ is unsubstituted or phenyl-, phenoxy-, cyclohexyloxy- or pyrazolyl-substituted $C_1$–$C_{10}$-alkyl with or without interruption by from 1 to 4 oxygen atoms in ether function, $C_5$–$C_7$-cycloalkyl or unsubstituted or $C_1$–$C_4$-alkyl-, $C_1$–$C_4$-alkoxy- or halogen-substituted phenyl, with the proviso that the total number of carbon atoms present in the two radicals $R^1$ and $R^2$ is at least 7 when $R^1$ and $R^2$ are each $C_1$–$C_{10}$-alkyl or when one of $R^1$ and $R^2$ is $C_1$–$C_{10}$-alkyl and the other is $C_5$–$C_7$-cycloalkyl, and to a process for dyeing or printing textile materials.

U.S. Pat. No. 5,079,365 discloses thiazolemethinepyridone dyes (including the above-excepted dyes). There the dyes are used for transfer from a transfer to a plastic-coated paper by diffusion by means of an energy source. There is no mention there of these dyes also being suitable for dyeing or printing textile materials.

It is an object of the present invention to provide novel methine dyes which are advantageously suitable for use in the textile sector. The novel dyes shall have good fastness to dry heat setting and pleating and possess high brilliance.

We have found that this object is achieved by the pyridone dyes of the formula I more particularly described at the beginning.

Any alkyl or alkenyl appearing in the abovementioned formula I may be straight-chain or branched.

In substituted alkyl appearing in the abovementioned formula I the number of substituents is generally 1 or 2.

In substituted phenyl, furanyl or thienyl appearing in the abovementioned formula I the number of substituents is generally from 1 to 3, preferably 1 or 2.

$R^1$, $R^2$, $R^3$, $R^4$ and $R^6$ are each for example methyl, ethyl, propyl, isopropyl, butyl, isobutyl, sec-butyl, phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,3-, 2,4- or 2,6-dimethylphenyl, 2-, 3- or 4-methoxyphenyl, 2-, 3- or 4-ethoxyphenyl, 2,3-, 2,4- or 2,6-dimethoxyphenyl, 2-, 3- or 4-fluorophenyl, 2-, 3- or 4-chlorophenyl or 2-, 3- or 4-bromophenyl.

$R^1$, $R^2$, $R^3$ and $R^6$ may each also be for example pentyl, isopentyl, neopentyl, tert-pentyl, hexyl, 2-methylpentyl, heptyl, octyl, 2-ethylhexyl, nonyl, decyl, cyclopentyl, cyclohexyl or cycloheptyl.

$R^1$, $R^2$ and $R^6$ may each also be for example benzyl, 1- or 2-phenylethyl, 2-methoxyethyl, 2-ethoxyethyl, 2-propoxyethyl, 2-isopropoxyethyl, 2-butoxyethyl, 2- or 3-methoxypropyl, 2- or 3 ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 3,6,9,12-tetraoxatridecyl or 3,6,9,12-tetraoxatetradecyl.

$R^1$ and $R^2$ may each also be for example 2-methoxycarbonylethyl, 2-ethoxycarbonylethyl, 2-propoxycarbonylethyl, 2-isopropoxycarbonylethyl, 2-butoxycarbonylethyl, 2- or 3-methoxycarbonylpropyl, 2- or 3-ethoxycarbonylpropyl, 2- or 3-propoxycarbonylpropyl, 2- or 3-butoxycarbonylpropyl, 2- or 4-methoxycarbonylbutyl, 2- or 4-ethoxycarbonylbutyl, 2- or 4-propoxycarbonylbutyl, 2- or 4-butoxycarbonylbutyl, 2-methoxycarbonyloxyethyl, 2-ethoxycarbonyloxyethyl, 2-propoxycarbonyloxyethyl, 2-isopropoxycarbonyloxyethyl, 2-butoxycarbonyloxyethyl, 2- or 3-methoxycarbonyloxypropyl, 2- or 3-ethoxycarbonyloxypropyl, 2- or 3-propoxycarbonyloxypropyl, 2- or 3-butoxycarbonyloxypropyl, 2- or 4-methoxycarbonyloxybutyl, 2- or 4-ethoxycarbonyloxybutyl, 2- or 4-propoxycarbonyloxybutyl, 2- or 4-butoxycarbonyloxybutyl, prop-1-en-3-yl, but-2-en-4-yl or 2-methylprop-1-en-3-yl.

$R^6$ may also be for example 2-benzyloxyethyl, 2-(pyrazol-1-yl)-ethyl, 2- or 3-benzyloxypropyl, 2- or 3-(pyrazol-1-yl)propyl, 2- or 4-benzyloxybutyl, 2- or 4-(pyrazol-1-yl)butyl, 2-phenoxyethyl, 2- or 3-phenoxypropyl, 2- or 4-phenoxybutyl, 2-cyclohexyloxyethyl, 2- or 3-cyclohexyloxypropyl or 2- or 4-cyclohexyloxybutyl.

$R^3$ may also be for example furan-2-yl, furan-3-yl, 3- or 4-methylfuran-2-yl, 3- or 4-chlorofuran-2-yl, thien-2-yl, thien-3-yl, 3- or 4-methylthien-2-yl or 3- or 4-chlorothien-2-yl.

$R^5$ is for example methoxycarbonyl, ethoxycarbonyl, propoxycarbonyl, isopropoxycarbonyl, butoxycarbonyl, pentyloxycarbonyl, hexaloxycarbonyl, heptyloxycarbonyl, octyloxycarbonyl, 2-ethylhexyloxycarbonyl, mono- or dimethylcarbamoyl, mono- or diethylcarbamoyl, mono- or dipropylcarbamoyl, mono- or dibutylcarbamoyl, mono- or dipentylcarbamoyl, mono- or dihexylcarbamoyl, mono- or diheptylcarbamoyl, mono- or dioctylcarbamoyl, mono- or bis(2-ethylhexyl)carbamoyl or N-methyl-N-ethylcarbamoyl.

$R^1$ and $R^2$ combined together with the nitrogen atom joining them together to form a 5- or 6-membered saturated heterocyclic radical with or without further hetero atoms can be for example pyrrolidinyl, piperidinyl, morpholinyl, thiomorpholinyl, thiomorpholinyl S,S-dioxide, piperazinyl or N-($C_1$–$C_4$-alkyl)piperazinyl.

Preference is given to dyes wherein the total number of carbon atoms present in the two radicals $R^1$ and $R^2$ is at least 8 when $R^1$ and $R^2$ in formula I are each $C_1$–$C_{10}$-alkyl or when one of $R^1$ and $R^2$ is $C_1$–$C_{10}$-alkyl and the other is $C_5$–$C_7$-cycloalkyl.

Preference is further given to pyridone dyes of the formula I where X is nitrogen.

Preference is further given to pyridone dyes of the formula I where $R^4$ is methyl.

Preference is further given to pyridone dyes of the formula I where $R^5$ is cyano.

Preference is further given to pyridone dyes of the formula I where $R^3$ is unsubstituted or $C_1$–$C_4$-alkyl-, $C_1$–$C_4$-alkoxy- or halogen-substituted phenyl or thienyl.

Preference is further given to pyridone dyes of the formula I where $R^6$ is $C_1$–$C_8$-alkyl, cyclopentyl, cyclohexyl or unsubstituted or $C_1$–$C_4$-alkyl- or $C_1$–$C_4$-alkoxy-substituted phenyl.

Preference is further given to pyridone dyes of the formula I where $R^1$ and $R^2$ are each independently of the other $C_1$–$C_8$-alkyl, which may be $C_1$–$C_4$-alkoxy-, $C_1$–$C_4$-alkoxycarbonyl- or phenyl-substituted, cyclopentyl, cyclohexyl or prop-1-en-3-yl.

Particular preference is given to pyridone dyes of the formula I where $R^3$ is phenyl or thienyl.

Particular preference is further given to pyridone dyes of the formula I where $R^6$ is $C_4$–$C_8$-alkyl or cyclohexyl.

Particular preference is further given to pyridone dyes of the formula I where $R^1$ and $R^2$ are each independently of the other $C_4$–$C_8$-alkyl, $C_1$–$C_4$-alkoxy-$C_1$–$C_4$-alkyl, $C_1$–$C_4$-alkoxycarbonyl-$C_2$–$C_4$-alkyl, benzyl or prop-1-en-3-yl or where one of the two radicals $R^1$ and $R^2$ is $C_1$–$C_4$-alkyl and the other is cyclohexyl.

Very particular preference is given to pyridone dyes of the formula I where $R^1$ and $R^2$ are each independently of the other $C_4$–$C_8$-alkyl, benzyl or prop-1-en-3-yl.

The pyridone dyes of the formula I according to the invention can be prepared by methods known per se, for example by condensing an aldehyde of the formula II

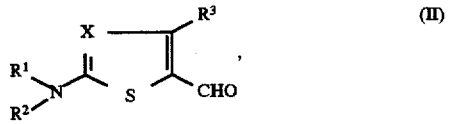

where X, $R^1$, $R^2$ and $R^3$ are each as defined above, with a pyridone of the formula III

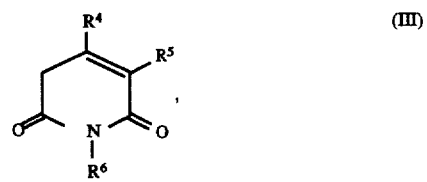

where $R^4$, $R^5$ and $R^6$ are each as defined above.

The present invention further provides a process for dyeing or printing textile materials, which comprises using pyridone dyes of the abovementioned formula I.

Preference is given to a process using dyes wherein the total number of carbon atoms present in the two radicals $R^1$ and $R^2$ is preferably at least 8 when $R^1$ and $R^2$ in formula I are each $C_1$–$C_{10}$-alkyl or when one of $R^1$ and $R^2$ is $C_1$–$C_{10}$-alkyl and the other is $C_5$–$C_7$-cycloalkyl.

Preference is further given to a process using pyridone dyes of the formula I where X is nitrogen.

Preference is further given to a process using pyridone dyes of the formula I where $R^4$ is methyl.

Preference is further given to a process using pyridone dyes of the formula I where $R^5$ is cyano.

Preference is further given to a process using pyridone dyes of the formula I where $R^3$ is unsubstituted or $C_1$–$C_4$-alkyl-, $C_1$–$C_4$-alkoxy- or halogen-substituted phenyl or thienyl.

Preference is further given to a process using pyridone dyes of the formula I where $R^6$ is $C_1$–$C_8$-alkyl, cyclopentyl, cyclohexyl or unsubstituted or $C_1$–$C_4$-alkyl- or $C_1$–$C_4$-alkoxy-substituted phenyl.

Preference is further given to a process using pyridone dyes of the formula I where $R^1$ and $R^2$ are each independently of the other $C_1$–$C_8$-alkyl, which is unsubstituted or $C_1$–$C_4$-alkoxy-, $C_1$–$C_4$-alkoxycarbonyl- or phenyl-substituted, cyclopentyl, cyclohexyl or prop-1-en-3-yl.

Particular preference is given to a process using pyridone dyes of the formula I where $R^3$ is phenyl or thienyl.

Particular preference is further given to a process using pyridone dyes of the formula I where $R^6$ is $C_4$–$C_8$-alkyl or cyclohexyl.

Particular preference is further given to a process using pyridone dyes of the formula I where $R^1$ and $R^2$ are each independently of the other $C_4$–$C_8$-alkyl, $C_1$–$C_4$-alkoxy-$C_2$–$C_4$-alkyl, $C_1$–$C_4$-alkoxycarbonyl-$C_2$–$C_4$-alkyl, benzyl or prop-1-en-3-yl or where one of the two radicals $R^1$ and $R^2$ is $C_1$–$C_4$-alkyl and the other is cyclohexyl.

Very particular preference is given to a process using pyridone dyes of the formula I where $R^1$ and $R^2$ are each independently of the other $C_4$–$C_8$-alkyl, benzyl or prop-1-en-3-yl.

For the purposes of the invention, textile materials are fibers, yarns, threads, knits, wovens or nonwovens composed of polyester, modified polyester, for example anionically modified polyester, or blend fabrics of polyesters with wool or cellulose derivatives, such as cotton or viscose. The dyeing and printing conditions are known per se. Details are also discernible from the Examples.

The novel pyridone dyes can be used as dye preparations. Such dye mixtures generally contain from 10 to 60% by weight, based on the weight of the dye preparation, of one or more of the pyridone dyes more particularly described at the beginning and from 40 to 90% by weight, based on the weight of the dye formulation, of dispersants, further assistants and/or water.

The novel pyridone dyes of the formula I yield brilliant dyeings in bluish red shades. The novel dyes are very strong and have good fastness to dry heat setting and pleating.

The Examples which follow illustrate the invention.

EXAMPLE 1

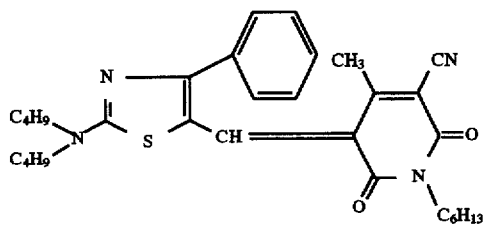

9.8 g of 2-dibutylamino-4-phenyl-5-formylthiazole and 7.03 g of 1-hexyl-3-cyano-4-methyl-6-hydroxypyrid-2-one were suspended in 20 ml acetic anhydride. The reaction mixture was refluxed for 10 min at from 138° C. to 140° C. It was then cooled down. The dye precipitated at 50° C. To maintain stirrability, 100 ml of methanol were added. The precipitate was then filtered off with suction at room temperature, washed with methanol and subsequently dried.

Yield: 76% of theory; mp.: 145° C.

$\lambda_{max}$: 532 nm, in tetrahydrofuran (THF)

| $C_{31}H_{40}N_4O_2S$ (532.8) | | | | | |
|---|---|---|---|---|---|
| | C | H | N | O | S |
| calc. | 69.6 | 7.6 | 10.5 | 6.0 | 6.0 |
| found | 69.7 | 7.7 | 10.5 | 6.0 | 6.1 |

The same method gave the dyes listed individually below and also the dyes listed in Tables 1 and 2.

EXAMPLE 2

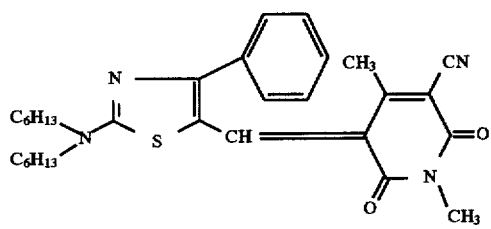

mp.: 146° C.

Yield: 81% of theory $\lambda_{max}$: 742 nm, in THF.

EXAMPLE 3

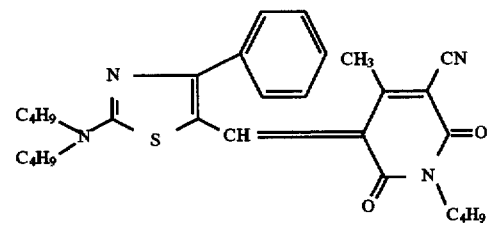

mp.: 180° C.

Yield: 88% of theory $\lambda_{max}$: 532 nm, in THF.

EXAMPLE 4

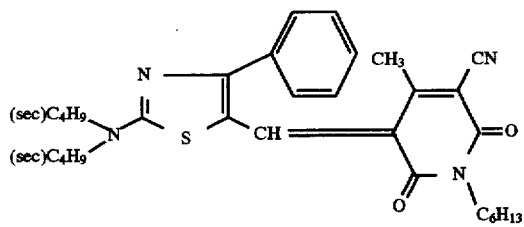

mp.: 80° C.–85° C.

Yield: 76% of theory $\lambda_{max}$: 741 nm, in THF.

EXAMPLE 5

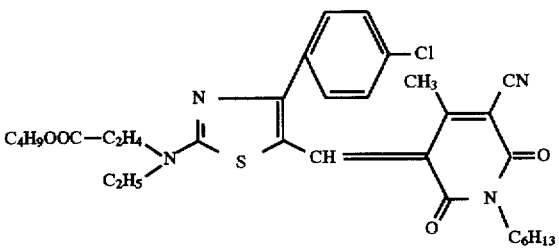

mp.: 121° C.

Yield: 50% of theory $\lambda_{max}$: 529 nm, in THF.

EXAMPLE 6

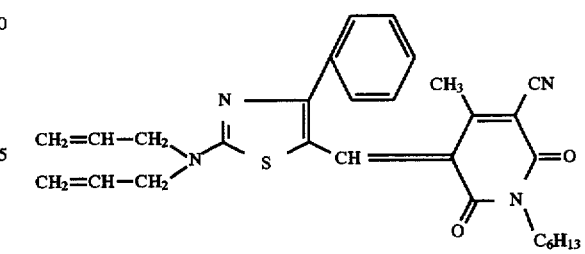

mp.: 157° C.

Yield: 70.4% of theory $\lambda_{max}$: 741 nm, in THF.

EXAMPLE 7

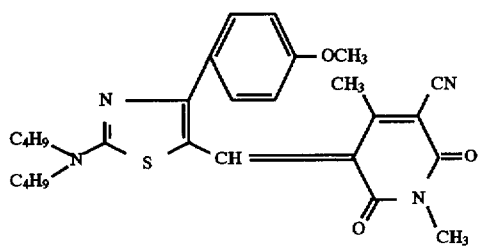

mp.: 180° C.

Yield: 82.5% of theory $\lambda_{max}$: 537 nm, in THF.

EXAMPLE 8

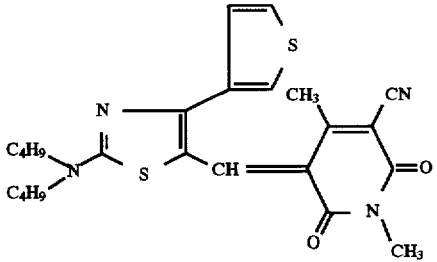

mp.: 203° C.

Yield: 89% of theory $\lambda_{max}$: 537 nm, in THF.
EXAMPLE 9
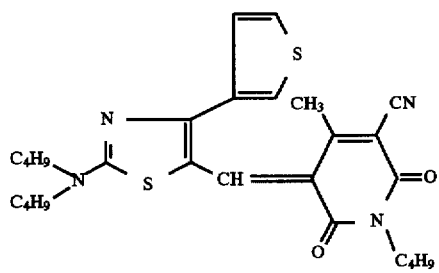
mp.: 174° C.
Yield: 88% of theory
$\lambda_{max}$: 537 nm, in THF.
EXAMPLE 10
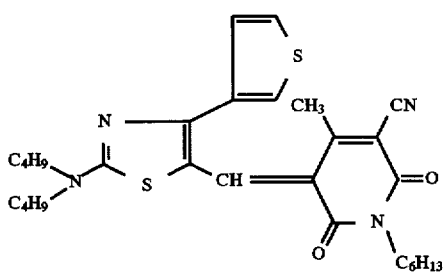
mp.: 149° C.
Yield: 74% of theory
$\lambda_{max}$: 537 nm, in THF.
TABLE 1
| Ex. No. | $L^1$ | $L^2$ | $L^3$ | $L^4$ | mp. [°C.] | λmax [nm] (in $CH_2Cl_2$) |
|---|---|---|---|---|---|---|
| 11 | $C_4H_9$ | $C_4H_9$ | $C_6H_5$ | p-tolyl | >260 | 537 |
| 12 | $C_4H_9$ | $C_4H_9$ | $C_6H_5$ | 2,6-dimethylphenyl | 158 | 537 |
| 13 | $C_4H_9$ | $C_4H_9$ | $C_6H_5$ | 2-isopropylphenyl | 178 | 537 |
| 14 | $C_4H_9$ | $C_4H_9$ | $C_6H_5$ | 2-methylphenyl | 143 | 537 |
| 15 | $C_4H_9$ | $C_4H_9$ | $C_6H_5$ | 2-methoxyphenyl | 240 | 537 |
| 16 | $C_2H_5$ | cyclohexyl | $C_6H_5$ | cyclohexyl | 207 | 537 |

TABLE 1-continued

[Structure: thiazole with L¹, L² on N; L³ and CH₃ substituents; CN group; pyridone with L⁴ on N]

| Ex. No. | L¹ | L² | L³ | L⁴ | mp. [°C.] | λmax [nm] (in CH₂Cl₂) |
|---|---|---|---|---|---|---|
| 17 | CH₃ | cyclohexyl-H | C₆H₅ | cyclohexyl-H | 221 | 534 |
| 18 | CH₃ | cyclohexyl-H | C₆H₅ | C₄H₉ | 227 | 534 |
| 19 | C₂H₅ | cyclohexyl-H | C₆H₅ | C₄H₉ | 213 | 536 |
| 20 | C₂H₅ | cyclohexyl-H | C₆H₅ | CH₃ | 202 | 535 |
| 21 | C₂H₅ | cyclohexyl-H | C₆H₅ | C₆H₁₃ | 202 | 535 |
| 22 | iso-C₄H₉ | iso-C₄H₉ | C₆H₅ |  | 204 | 537 |
| 23 | iso-C₄H₉ | iso-C₄H₉ | C₆H₅ | CH₃ | 220 | 535 |
| 24 | sec-C₄H₉ | sec-C₄H₉ | C₆H₅ | C₄H₉ | 160 | 540 |
| 25 | sec-C₄H₉ | sec-C₄H₉ | C₆H₅ | CH₃ | 219 | 538 |
| 26 | CH₂C₆H₅ | CH₂C₆H₅ | C₆H₅ | C₆H₁₃ | 198 | 531 |
| 27 | C₂H₅ | C₂H₄COOC₄H₉ | p-Cl-C₆H₄ | C₄H₉ | 174 | 532 |
| 28 | CH₂CH(C₄H₉)C₂H₅ | CH₂CH(C₄H₉)C₂H₅ | C₆H₅ | CH₃ | 128 | 538 |
| 29 | CH₂CH(C₄H₉)C₂H₅ | CH₂CH(C₄H₉)C₂H₅ | C₆H₅ | C₄H₉ | 89 | 539 |
| 30 | CH₂—CH=CH₂ | CH₂—CH=CH₂ | C₆H₅ | CH₃ | 194 | 533 |
| 31 | CH₂—CH=CH₂ | CH₂—CH=CH₂ | C₆H₅ | C₄H₉ | 172 | 532 |
| 32 | CH₂CH(C₄H₉)C₂H₅ | CH₂CH(C₄H₉)C₂H₅ | C₆H₅ | C₆H₁₃ | 63–65 | 539 |
| 33 | CH₂—CH=CH₂ | CH₂—CH=CH₂ | p-CH₃-C₆H₄ | CH₃ | 224 | 534 |
| 34 | CH₂—CH=CH₂ | CH₂—CH=CH₂ | p-CH₃-C₆H₄ | C₄H₉ | 169 | 534 |
| 35 | CH₂—CH=CH₂ | CH₂—CH=CH₂ | p-CH₃-C₆H₄ | C₆H₁₃ | 180 | 533 |

TABLE 1-continued

| Ex. No. | L¹ | L² | L³ | L⁴ | mp. [°C.] | λmax [nm] (in CH$_2$Cl$_2$) |
|---|---|---|---|---|---|---|
| 36 | | —(CH$_2$)$_4$— | C$_6$H$_5$ | CH$_3$ | >255 | 534 |
| 37 | | —(CH$_2$)$_4$— | C$_6$H$_5$ | C$_4$H$_9$ | 251 | 534 |
| 38 | | —(CH$_2$)$_4$— | C$_6$H$_5$ | C$_6$H$_13$ | 115 | 533 |
| 39 | C$_2$H$_4$OCH$_3$ | C$_2$H$_4$OCH$_3$ | C$_6$H$_5$ | C$_6$H$_13$ | 180 | 533 |
| 40 | C$_4$H$_9$ | C$_4$H$_9$ | —C$_6$H$_4$—OCH$_3$ | C$_4$H$_9$ | 182 | 542 |
| 41 | C$_4$H$_9$ | C$_4$H$_9$ | —C$_6$H$_4$—OCH$_3$ | C$_6$H$_13$ | 161 | 542 |
| 42 | CH$_2$C$_6$H$_5$ | CH$_2$C$_6$H$_5$ | C$_6$H$_5$ | CH$_3$ | 225 | 533 |
| 43 | CH$_2$C$_6$H$_5$ | CH$_2$C$_6$H$_5$ | C$_6$H$_5$ | C$_4$H$_9$ | 214 | 533 |
| 44 | C$_5$H$_{11}$ | C$_5$H$_{11}$ | C$_6$H$_5$ | CH$_3$ | 151 | 537 |
| 45 | C$_5$H$_{11}$ | C$_5$H$_{11}$ | C$_6$H$_5$ | C$_4$H$_9$ | 168 | 537 |
| 46 | C$_5$H$_{11}$ | C$_5$H$_{11}$ | C$_6$H$_5$ | C$_6$H$_{13}$ | 117 | 537 |
| 47 | C$_6$H$_{13}$ | C$_6$H$_{13}$ | C$_6$H$_5$ | C$_4$H$_9$ | 163 | 537 |
| 48 | C$_6$H$_{13}$ | C$_6$H$_{13}$ | C$_6$H$_5$ | C$_6$H$_{13}$ | 138 | 537 |
| 49 | C$_4$H$_9$ | C$_4$H$_9$ | C$_6$H$_5$ | C$_3$H$_6$—N(pyrazolyl) | 163 | 538 |
| 50 | C$_4$H$_9$ | C$_4$H$_9$ | C$_6$H$_5$ | C$_3$H$_6$OCH$_2$C$_6$H$_5$ | 125 | 538 |
| 51 | C$_6$H$_{13}$ | C$_6$H$_{13}$ | C$_6$H$_5$ | C$_6$H$_5$ | | 539 |
| 52 | C$_2$H$_4$OCH$_3$ | C$_2$H$_4$OCH$_3$ | C$_6$H$_5$ | CH$_3$ | 215 | 534 |
| 53 | C$_4$H$_9$ | C$_4$H$_9$ | C$_6$H$_5$ | C$_4$H$_9$ | | 536 |
| 54 | C$_4$H$_9$ | C$_4$H$_9$ | 2-thienyl | C$_6$H$_{13}$ | | 555 |
| 55 | C$_4$H$_9$ | C$_4$H$_9$ | C(CH$_3$)$_3$ | CH$_3$ | | 534 |
| 1. | C$_4$H$_9$ | C$_4$H$_9$ | C(CH$_3$)$_3$ | C$_4$H$_9$ | | 534 |
| 2. | C$_4$H$_9$ | C$_4$H$_9$ | C(CH$_3$)$_3$ | C$_6$H$_{13}$ | | 534 |
| 3. | C$_2$H$_5$ | C$_3$H$_6$OC$_2$H$_4$OCH$_3$ | C$_6$H$_5$ | CH$_3$ | | 534 |
| 4. | C$_2$H$_5$ | C$_3$H$_6$OC$_2$H$_4$OCH$_3$ | C$_6$H$_5$ | C$_4$H$_9$ | | 532 |
| 5. | C$_2$H$_5$ | C$_3$H$_6$OC$_2$H$_4$OCH$_3$ | C$_6$H$_5$ | C$_6$H$_{13}$ | | 534 |
| 6. | C$_2$H$_4$O(C$_2$H$_4$O)$_2$CH$_3$ | C$_2$H$_4$O(C$_2$H$_4$O)$_2$CH$_3$ | C$_6$H$_5$ | CH$_3$ | | 531 |
| 7. | C$_2$H$_4$O(C$_2$H$_4$O)$_2$CH$_3$ | C$_2$H$_4$O(C$_2$H$_4$O)$_2$CH$_3$ | C$_6$H$_5$ | C$_4$H$_9$ | | 532 |
| 8. | C$_2$H$_4$O(C$_2$H$_4$O)$_2$CH$_3$ | C$_2$H$_4$O(C$_2$H$_4$O)$_2$CH$_3$ | C$_6$H$_5$ | C$_6$H$_{13}$ | | 533 |
| 9. | C$_4$H$_9$ | C$_4$H$_9$ | CH(CH$_3$)$_2$ | C$_6$H$_{13}$ | | 527 |
| 10. | C$_4$H$_9$ | C$_4$H$_9$ | CH(CH$_3$)$_2$ | C$_4$H$_9$ | | 528 |
| 11. | C$_4$H$_9$ | C$_4$H$_9$ | CH(CH$_3$)$_2$ | CH$_3$ | | 526 |
| 12. | C$_4$H$_9$ | C$_4$H$_9$ | cyclohexyl | CH$_3$ | | 529 |
| 13. | C$_4$H$_9$ | C$_4$H$_9$ | cyclohexyl | C$_4$H$_9$ | | 529 |
| 14. | C$_4$H$_9$ | C$_4$H$_9$ | cyclohexyl | C$_6$H$_{13}$ | | 529 |

TABLE 1-continued

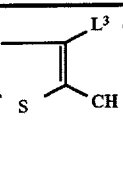

| Ex. No. | L¹ | L² | L³ | L⁴ | mp. [°C.] | λmax [nm] (in CH₂Cl₂) |
|---|---|---|---|---|---|---|
| 15. | $C_6H_{13}$ | $C_6H_{13}$ | cyclohexyl-H | $CH_3$ | | 529 |
| 16. | $C_6H_{13}$ | $C_6H_{13}$ | cyclohexyl-H | $C_4H_9$ | | 529 |
| 17. | $C_6H_{13}$ | $C_6H_{13}$ | cyclohexyl-H | $C_6H_{13}$ | | 529 |
| 18. | $CH(CH_3)_2$ | $CH_3O$-phenyl | $C_6H_5$ | $C_4H_9$ | | 533 |
| 19. | $CH(CH_3)_2$ | $CH_3O$-phenyl | $C_6H_5$ | $C_6H_{13}$ | | 533 |
| 20. | $C_2H_5$ | $CH_3$-phenyl (m) | $C_6H_5$ | $C_6H_{13}$ | | 534 |
| 21. | $C_4H_9$ | $C_4H_9$ | $C_3H_7$ | $CH_3$ | | 527 |
| 22. | $C_4H_9$ | $C_4H_9$ | $CH_3$-phenyl (o) | $CH_3$ | | 528 |
| 23. | $C_4H_9$ | $C_4H_9$ | $CH_3$-phenyl (o) | $C_4H_9$ | | 529 |
| 24. | $C_4H_9$ | $C_4H_9$ | $C_3H_7$ | $C_6H_{13}$ | | 528 |
| 25. | $C_4H_9$ | $C_4H_9$ | $CH(C_2H_5)C_4H_9$ | $CH_3$ | | 526 |
| 26. | $C_4H_9$ | $C_4H_9$ | $CH_3$-phenyl (o) | $C_6H_{13}$ | | 528 |
| 27. | $C_4H_9$ | $C_4H_9$ | $CH(C_2H_5)C_4H_9$ | $C_6H_{13}$ | | 527 |
| 28. | $C_4H_9$ | $C_4H_9$ | $C(CH_3)_3$ | $C_2H_4OCH_3$ | | 535 |

TABLE 1-continued

Structure:

$$\underset{L^2}{\overset{L^1}{N}}{-}\underset{\|}{C}{-}\underset{S}{\phantom{X}}\underset{CH=}{\overset{L^3}{C}={C}}\cdots\overset{CH_3}{C}={C}(CN){-}C(={O}){-}N(L^4){-}C(={O}){-}$$

(pyridone structure with substituents $L^1, L^2, L^3, L^4$)

| Ex. No. | $L^1$ | $L^2$ | $L^3$ | $L^4$ | mp. [°C.] | λmax [nm] (in $CH_2Cl_2$) |
|---|---|---|---|---|---|---|
| 29. | $C_4H_9$ | $C_4H_9$ | $C(CH_3)_3$ | $C_3H_6OCH_3$ | | 534 |
| 30. | $C_4H_9$ | $C_4H_9$ | $C_6H_5$ | $C_2H_4OCH_3$ | | 538 |
| 31. | $C_4H_9$ | $C_4H_9$ | $C_6H_5$ | $C_3H_6OCH_3$ | | 538 |
| 32. | $C_4H_9$ | $C_4H_9$ | $CH(C_2H_5)C_4H_9$ | $C_4H_9$ | | 527 |
| 33. | $CH_2C_6H_5$ | $CH_2C_6H_5$ | $C(CH_3)_3$ | $CH_3$ | | 530 |
| 34. | $CH_2C_6H_5$ | $CH_2C_6H_5$ | $C(CH_3)_3$ | $C_4H_9$ | | 531 |
| 35. | $CH_2C_6H_5$ | $CH_2C_6H_5$ | $C(CH_3)_3$ | $C_6H_{13}$ | | 531 |

TABLE 2

Structure with X, $L^1$–$L^6$ substituents on pyridone dye skeleton.

| Bsp. Nr. | $L^1$ | $L^2$ | $L^3$ | X | $L^4$ | $L^5$ | $L^6$ | λmax [nm] (in $CH_2Cl_2$) |
|---|---|---|---|---|---|---|---|---|
| 91 | $C_4H_9$ | $C_4H_9$ | $C_6H_5$ | N | $CH_3$ | $CONHCH_3$ | $CH_3$ | 520 |
| 92 | sec-$C_4H_9$ | sec-$C_4H_9$ | $C_6H_5$ | N | $CH_3$ | $CONHCH_3$ | H | 551 |
| 93 | $C_4H_9$ | $C_4H_9$ | $C(CH_3)_3$ | N | $CH_3$ | $CONHCH_3$ | $CH_3$ | 524 |
| 94 | $C_4H_9$ | $C_4H_9$ | $C(CH_3)_3$ | N | $CH_3$ | benzimidazolyl group | $CH_3$ | 552 |
| 95 | $C_4H_9$ | $C_4H_9$ | $C_6H_5$ | N | $CH_3$ | CN | H | 545 |
| 96 | sec-$C_4H_9$ | sec-$C_4H_9$ | $C_6H_5$ | N | $CH_3$ | CN | H | 558 |
| 97 | $C_4H_9$ | $C_4H_9$ | $C_6H_5$ | N | $C_6H_{13}$ | CN | H | 553 |
| 98 | $C_4H_9$ | $C_4H_9$ | $C_6H_5$ | N | $CH_2CH(C_2H_5)C_4H_9$ | CN | H | 550 |
| 99 | $C_4H_9$ | $C_4H_9$ | $C(CH_3)_3$ | C—CN | $C_2H_5$ | CN | $CH_3$ | 559 |

Dyeing method 5 g of polyester fabric (PES) are introduced at 50° C. into 100 ml of a dyeing liquor which contains a below-specified dye and whose pH has been set to 4.5 with acetic acid/sodium acetate. After 5 minutes at 50° C. the liquor is raised to 130° C., held at that temperature for 45 minutes and then cooled down to 70° C. over 20 minutes.

Thereafter the dyed polyester fabric is reduction cleared by treating it for 15 minutes at 70° C. in 200 ml of liquor containing 5 ml/l of 32% strength by weight sodium hydroxide solution, 3 g/l of sodium dithionite and 1 g/l of an addition product of 48 mol of ethylene oxide with 1 mol of castor oil. Finally the fabric is rinsed, neutralized with dilute acetic acid, rinsed once more and dried.

The dyes of Examples 1 to 10 and 19 were dyed up by the above dyeing method. Very strong dyeings were obtained in brilliant bluish red shades.

We claim:

1. Pyridone dyes of the formula I

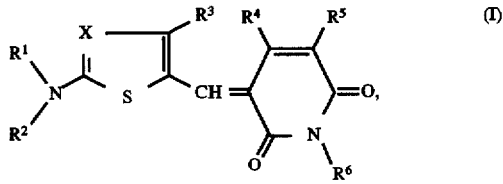

where

X is nitrogen or C—CN, $R^1$ and $R^2$ are identical or different and each is independently of the other unsubstituted or $C_1$–$C_4$-alkoxycarbonyl-, $C_1$–$C_4$-alkoxycarbonyloxy- or phenyl-substituted $C_1$–$C_{10}$-alkyl with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy- or halogen-substituted phenyl, or $R^1$ and $R^2$ are together with the nitrogen atom joining them together a 5- or 6-membered saturated heterocyclic radical with or without further hetero atoms, $R^3$ is hydrogen, $C_1$–$C_{10}$-alkyl, $C_5$–$C_7$-cycloalkyl, or benzyl, $R^4$ is hydrogen, $C_1$–$C_4$-alkyl or unsubstituted or $C_1$–$C_4$-alkyl-, $C_1$–$C_4$-alkoxy- or halogen-substituted phenyl, $R^5$ is cyano, carbamoyl, mono- or di($C_1$–$C_8$-alkyl) carbamoyl, carboxyl, $C_1$–$C_8$-alkoxycarbonyl or benzimidazolyl, and $R^6$ is unsubstituted or phenyl-, phenoxy-, cyclohexyloxy- or pyrazolyl-substituted $C_1$–$C_{10}$-alkyl with or without interruption by from 1 to 4 oxygen atoms in ether function, $C_5$–$C_7$-cycloalkyl or unsubstituted or $C_1$–$C_4$-alkyl-, $C_1$–$C_4$-alkoxy- or halogen-substituted phenyl, with the proviso that the total number of carbon atoms present in the two radicals $R^1$ and $R^2$ is at least 7 when $R^1$ and $R^2$ are each $C_1$–$C_{10}$-alkyl or when one of $R^1$ and $R^2$ is $C_1$–$C_{10}$-alkyl and the other is $C_5$–$C_7$-cycloalkyl.

2. Pyridone dyes as claimed in claim 1, wherein X is nitrogen.

3. Pyridone dyes as claimed in claim 1, wherein $R^4$ is methyl.

4. Pyridone dyes as claimed in claim 1, wherein $R^3$ is unsubstituted or $C_1$–$C_4$-alkyl-, $C_1$–$C_4$-alkoxy- or halogen-substituted phenyl or thienyl.

5. Pyridone dyes as claimed in claim 1, wherein $R^6$ is $C_1$–$C_8$-alkyl, cyclopentyl, cyclohexyl or unsubstituted or $C_1$–$C_4$-alkyl- or $C_1$–$C_4$-alkoxy-substituted phenyl.

6. Pyridone dyes as claimed in claim 1, wherein $R^3$ is hydrogen.

7. Pyridone dyes as claimed in claim 1, wherein $R^3$ is $C_1$–$C_{10}$-alkyl.

8. Pyridone dyes as claimed in claim 1, wherein $R^3$ is $C_5$–$C_7$-cycloalkyl.

9. Pyridone dyes as claimed in claim 1, wherein $R^3$ is benzyl.

10. A process for dyeing or printing a textile material, which comprises applying to said textile material a pyridone dye as claimed in claim 1.

* * * * *